United States Patent [19]

Andrejco et al.

[11] Patent Number: 4,812,153

[45] Date of Patent: Mar. 14, 1989

[54] METHOD OF MAKING A GLASS BODY HAVING A GRADED REFRACTIVE INDEX PROFILE

[75] Inventors: Matthew J. Andrejco, Clinton; John B. MacChesney, Lebanon, both of N.J.

[73] Assignees: American Telephone and Telegraph Company, Murray Hill; AT&T Bell Laboratories & Bell Communications Research, Livingston, both of N.J.

[21] Appl. No.: 2,731

[22] Filed: Jan. 12, 1987

[51] Int. Cl.[4] .............................................. C03C 25/02
[52] U.S. Cl. ...................... 65/3.12; 65/3.11; 65/3.15; 65/18.2; 65/18.3; 65/18.4; 65/30.13; 65/31; 65/900
[58] Field of Search ..................... 65/3.12, 3.15, 30.13, 65/31, 32, 18.2, 18.3, 18.4, 157, 900, 901, 3.11, DIG. 16, DIG. 144

[56] References Cited

U.S. PATENT DOCUMENTS

| | | | |
|---|---|---|---|
| 3,873,408 | 3/1975 | Hensler | 65/30.13 |
| 3,954,431 | 5/1976 | Fleming et al. | 65/18 |
| 4,061,486 | 12/1977 | Jahn | 65/30.13 |
| 4,110,093 | 8/1978 | Macedo et al. | 65/30.13 |
| 4,165,223 | 8/1979 | Powers | 65/2 |
| 4,230,472 | 10/1980 | Schultz | 65/3 A |
| 4,249,924 | 2/1981 | de Panafieu et al. | 65/3.15 |
| 4,304,581 | 12/1981 | Saifi | 65/3.12 |
| 4,372,648 | 2/1983 | Blach | 65/DIG. 16 |
| 4,421,539 | 12/1983 | Edahero et al. | 65/18.4 |
| 4,525,189 | 6/1985 | Ohmi et al. | 65/3.15 |
| 4,599,098 | 7/1986 | Sarkar | 65/3.12 |
| 4,675,040 | 6/1987 | Tanaka et al. | 65/DIG. 16 |

FOREIGN PATENT DOCUMENTS

| | | | |
|---|---|---|---|
| 0087061 | 8/1983 | European Pat. Off. | 65/900 |
| 0134128 | 10/1979 | Japan | 65/900 |
| 0160928 | 10/1982 | Japan | 65/900 |
| 0186426 | 9/1985 | Japan | 65/900 |
| J681036A | 9/1985 | Japan . | |

OTHER PUBLICATIONS

*Journal of Lightwave Technology*, vol. LT-4, No. 8, Aug. 1986, "Design and Performance of Gaussian-Profile Dispersion-Shifted Fibers Manufactured by VAD Process", by R. Yamauchi et al., pp. 997-10004.

Primary Examiner—Kenneth M. Schor
Assistant Examiner—L. Johnson
Attorney, Agent, or Firm—Eugen E. Pacher

[57] ABSTRACT

A glass body having a graded (substantially Gaussian) index profile is produced by a process that comprises providing a doped porous body (e.g., having a uniform dopant distribution), heat treating the porous body in a halogen-containing atmosphere, and consolidating the porous body into the glass body. The heat treatment removes a predetermined portion of the dopant from the porous body, such that the radial dopant profile in the glass body differs from the initial profile in the porous body, and such that the Gaussian index profile results. Exemplarily, the porous body is a uniformly germania-doped, VAD-produced, high-silica rod having radially decreasing density, and the heat treatment comprises an 8-hour densification soak at 1300° C. in 20% Cl, 80% He. In a preferred embodiment, silica overcladding is deposited on a graded index core rod produced according to the invention, and fiber drawn from the resulting composite glass body.

8 Claims, 6 Drawing Sheets

METHOD OF MAKING A GLASS BODY HAVING A GRADED REFRACTIVE INDEX PROFILE

FIELD OF THE INVENTION

This invention pertains to methods for making a glass body having a graded refractive index profile. A particular example of such a body is an optical fiber with a graded index core.

BACKGROUND OF THE INVENTION

Optical fibers with graded index core are not only used as multimode fibers, but it is also known that single mode fibers with appropriately graded core can, for instance, have zero chromatic dispersion at a wavelength that is substantially longer (e.g., at 1.55 $\mu$m) than the wavelength of zero material dispersion of the fiber material. Such "dispersion-shifted" single mode fibers are of considerable interest. In current practice the fiber material is almost invariably silica-based (typically more than 80% silica).

Very low loss dispersion-shifted single mode fibers can be advantageously used in long haul transmission systems, where they may permit repeater spacings of 50 km or more. However, dispersion-shifted single mode optical fibers are expected to find also significant use in applications that do not demand extremely low loss. For instance, optical fiber in the loop and distribution portion of the public switched telephone and data transmission network, and in so-called local area networks, frequently may require only moderately low loss. In these and similar applications, the distances involved typically are relatively modest, and repeaters may not be required, even if fiber having only modest loss (e.g., up to a few dB/km at the operating wavelength) is used. However, for obvious reasons, it will be necessary that such fiber have relatively low cost. It is thus important that techniques be developed that will make possible relatively low cost production of low to moderate loss graded index optical fiber.

All commercially significant prior art techniques for producing graded index fiber involve deposition of doped high silica material (typically the product of a reaction involving gaseous precursors such as $SiCl_4$, $GeCl_4$ and $O_2$), with the dopant concentration in the deposited material caused to be a function of the radial coordinate, such that the desired radially varying index profile results. For instance, R. Yamauchi et al, *Journal of Lightwave Technology*, Vol. LT-4, No. 8, August 1986, pp. 997–1004 disclose a dispersion-shifted single mode optical fiber with a Gaussian core profile that was produced by the VAD process. Preform production was relatively complicated, involving the use of multiple burners and including the use of a special core deposition burner, and can be expected to pose significant repeatability problems. Furthermore, attainment of zero dispersion at the desired wavelength required selection of the elongated size of an as-grown preform and of the dimension of the overjacketing tube, steps which, inter alia, require costly measurements and, in a production mode, maintenance of a relatively large inventory of over-jacketing tubes and/or preforms.

In general, at least some currently technologically significant glass deposition techniques (e.g., VAD) can readily produce step index profiles but do not readily lend themselves to the production of graded index profiles.

Prior art techniques for forming graded index fiber generally were designed such as to prevent alteration of the as-deposited dopant profile. For instance, all flame hydrolysis techniques such as VAD and OVPO require removal of OH, water, and possibly other hydrogen-containing species from the porous body that is formed by deposition of the high-silica soot produced by the flame hydrolysis, and consolidation of the porous body. This removal, usually referred to as "drying", is generally accomplished by exposing the porous body to a chlorine-containing atmosphere while the body is maintained at an elevated temperature, with the conditions chosen such that loss of germania (or other dopants) from the porous body is minimized.

In particular, the prior art teaches that the drying and consolidation atmosphere should contain a relatively high proportion of oxygen, and that the chlorine content of the atmosphere be kept relatively low. See, for instance, U.S. Pat. No. 4,165,223, which teaches that the drying gas mixture should comprise chlorine and oxygen in amounts sufficient to substantially eliminate water from the preform while not removing excessive amounts of dopant oxide therefrom, also teaches that the amount of chlorine and oxygen should be within the ranges of 0.1 to 9 and 1 to 99.9 vol. %, respectively. More particularly, U.S. Pat. No. 4,165,223 teaches that, based on actual experience, the ratio (vol. % $Cl_2$)$^2$/(vol. % $O_2$) should be less than 1 volume %, to prevent excessive leaching of dopant oxide from the preform, with the preferred value of this ratio being less than 0.1 volume %. Furthermore, U.S. Pat. No. 4,165,223 teaches that the preform pore structure should be substantially uniform, since this minimizes the tendency for oxygen to be trapped within the preform.

Among known techniques for making optical fiber are those which involve providing a glass core member, depositing on the core member porous material, consolidating the porous material such that a homogeneous glass body results, and drawing the optical fiber from the homogeneous glass body. See, for instance, U.S. Pat. No. 4,230,472, which teaches that the core member should consist of glass doped to have a relatively high refractive index, and that the particulate material deposited on the core member should have a composition such that the glass resulting therefrom has a relatively low refractive index, with the core of the optical fiber drawn from the body consisting of core member material and the cladding of the optical fiber consisting of the deposited material.

In view of the economic significance of graded index optical fiber, methods that can be used to economically and reliably produce such fibers are of substantial interest. This application discloses such a method.

GLOSSARY AND DEFINITIONS

The refractive index profile of an optical fiber comprises a high-index portion (the core) and a lower-index portion (the cladding) surrounding the core. The cladding need not have a radially constant refractive index, and optical fibers having a multiplicity of cladding layers of different refractive index are known.

Optical fiber generally has either a step index or a graded index core profile. In the former case the refractive index in the core is substantially constant, and in the latter case it is a predetermined function of the radius, typically with a maximum $n_c$ at the center of the core. A variety of graded core profiles are known, including the "Gaussian" profile.

As commonly used in the art, a graded index profile is herein referred to as "Gaussian" if it is generally bell-shaped, with a relatively smooth transition between the core and cladding portions of the profile. The core radius a is defined to be that radius at which the index difference $\Delta n(r) = n(r) - n_{cl}$ is $\Delta n_c/e^2$, where $\Delta n_c = n_c - n_{cl}$. Here r is the radial coordinate, $n_{cl}$ is the effective refractive index of the cladding region (frequently herein $n_{cl} = n_{SiO_2}$, the refractive index of undoped vitreous silica), and e is the base of the natural logarithm.

As is well known to those skilled in the art, actual optical fiber profiles typically deviate, as a result of unavoidable manufacturing process characteristics, from the theoretical profiles used in, e.g., the design of fibers. The effects of these deviations are generally well understood and taken into account in fiber design. As is common practice, references herein to a particular index profile are meant to refer to a theoretical profile, unless stated otherwise.

By an "essentially dry" porous body or glass body we mean herein a porous body from which water, OH, and possibly other hydrogen-containing species were removed by an appropriate drying process, and a glass body formed from such a dry porous body, respectively.

SUMMARY OF THE INVENTION

In a broad aspect this application discloses a novel method for producing a high-silica glass body that comprises an inner region and an outer region that differ in their composition and, consequently, in their refractive index, in a predetermined manner. In particular, we are disclosing a novel and potentially low cost method for producing a high-silica glass body having a substantially Gaussian index profile, and to articles produced by the method.

In its broad aspect the method comprises providing a porous body having a first dopant distribution, and removing, by means of a procedure comprising an appropriate heat treatment in a halogen-containing atmosphere, some of the dopant from the porous body, and consolidating the porous body into a glass body having a second dopant distribution that differs in its radial profile from the first distribution and imparts the substantially Gaussian index profile to the glass body. Generally, the second dopant distribution is substantially Gaussian, and the first dopant distribution is non-Gaussian, e.g., the more readily producable step distribution. The porous body has, during at least a part of the heat treatment, a radially non-uniform density, with the density in the central portion of the dopant-containing region of the body being higher than in the peripheral portion thereof.

Although the inventive method will be described herein in terms of a germania-doped silica body, the method is not so limited, and can potentially be used also with other dopants such as P, B, Al, Pb, Sn, Na, K, Mg, Ca, and the rare earths, provided the dopant element readily forms a volatile halide. This will be discussed in more detail below.

In a preferred embodiment the inventive method comprises providing a $GeO_2$-containing porous high-silica body, heating the porous body and contacting it with a $Cl_2$-containing atmosphere such that the porous body is transformed into a substantially OH-free glass body. The provided porous body has a radially non-uniform density, with the density in the central portion of the $GeO_2$-containing region being higher than in the peripheral portion thereof, and the heating and contacting are carried out such that some $GeO_2$ is removed from the body, such that the approximately Gaussian index profile results.

More particularly, the heating and contacting steps in the above preferred embodiment typically comprise maintaining the porous body at a densification temperature in the range from about 1250° C. to about 1350° C., and the atmosphere comprises, at least during a substantial portion of the time the porous body is maintained at the densification temperature, a relatively large amount of chlorine (typically more than about 5% by volume) and a relatively small amount of $O_2$ (typically less than about 1% by volume). The ratio (vol. % $Cl_2)^2$/(vol. % $O_2$) is $>1$, typically $>5$, preferably $>20$ vol. %. Typically, the heat treatment also comprises a soak at a consolidation temperature that is greater than the densification temperature, since the soak at the densification temperature frequently does not result in formation of a fuly consolidated glass body from the porous body.

The currently preferred embodiments of the instant invention comprise provision of a doped porous body having a radially non-uniform density that is higher in the central portion of the body than in the peripheral portion. However, we also contemplate embodiments wherein the doped porous body is initially of substantially uniform density (such a body could be produced, for instance, by a sol/gel process), and the heat treatment conditions are chosen such that the density of the central portion of the body increases more rapidly than that of the peripheral portion, resulting in preferential removal of dopant from the peripheral portion.

As will be appreciated by those skilled in the art, the details of the heat treatment (e.g., densification time and/or temperature, consolidation time and/or temperature) depend, inter alia, on the composition of the porous body. For instance, since P-doped silica has a lower softening point than silica containing an equal concentration of Ge, the densification and consolidation temperatures of a P-doped porous high silica body can be expected to be lower than those appropriate for a Ge-doped body. A minor amount of experimentation typically will suffice to determine the heat treatment conditions for any given porous body.

Although a glass body as produced by the inventive technique can be expected to have many uses, including direct use as an optical fiber preform or as a graded index lens, we currently envisage that its most important use may be as a core member in the production of an optical fiber preform. As such, high silica soot particles could be deposited thereon by a known technique (e.g., as described above), gel-derived particulate material could be deposited thereon (e.g., by means of a plasma-torch as disclosed in U.S. Pat No. 3,954,431, incorporated herein by reference), a tubular gel body could be formed around the core member, or overcladding material could be added by any other appropriate technique. In all these cases, the added high-silica cladding material is consolidated such that a homogeneous composite glass body, consisting of both the core member and the overcladding material added thereto, results. Fiber is then drawn from the thus produced composite glass body in the usual manner.

It will be appreciated that in the above-described embodiment of the inventive method the core member not only provides the fiber core but also the cladding material that immediately surrounds the core of the fiber, with the overcladding material added to the core member providing the outer cladding material. The physical interface between core member material and overcladding material thus does not coincide with the core/cladding boundary, and this has an important and advantageous effect on fiber properties.

In particular, the physical interface is a likely site for bubbles, inclusions, and other defects in the glass. Such defects are known to cause scattering of the radiation guided in the fiber, and thus increase fiber loss. The loss contributed by such defects is, of course, proportional to the energy density of the guided radiation at the defect site. In single mode fibers an appreciable portion of the total guided radiation energy is not confined to the core but extends into the cladding, decreasing approximately exponentially with increasing radial distance from the core/cladding boundary. Since in fiber according to the invention the physical interface is at a larger radius (R) than the core/cladding boundary (a), the inventive fiber can have a relatively low loss, as compared to prior art fiber of the type described, for instance, in U.S. Pat. No. 4,230,472.

DETAILED DESCRIPTION OF SOME PREFERRED EMBODIMENTS

Figure 1:
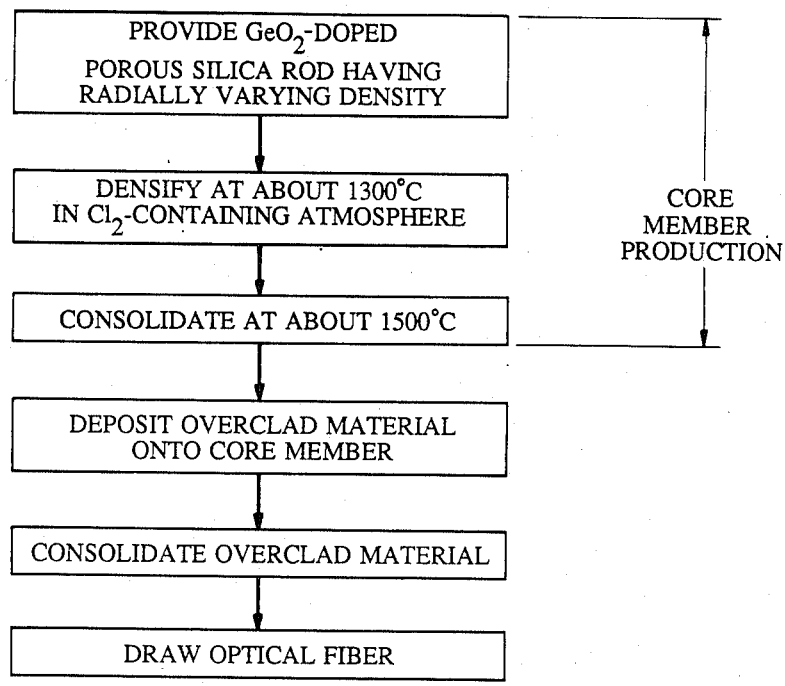
FIG. 1 shows in block diagram form major steps of an exemplary embodiment of the inventive method.

FIG. 1 shows, in form of a flow chart, major steps of an exemplary currently preferred embodiment of the invention. A high-silica glass core member having an approximately Gaussian index profile is produced, high-silica overclad material is deposited on the core member, the overclad material is consolidated and an optical preform produced thereby. Optical fiber is then drawn from the preform in a known manner.

The core member is produced as follows: A $GeO_2$-doped porous body having a radially varying density is densified in a chlorine-containing atmosphere that is furthermore low in $O_2$. Typically, the atmosphere comprises between about 1 and about 20 vol. % chlorine, and less than 1 vol. % oxygen, and the densification typically requires maintaining the porous body at a temperature in the approximate range 1250°-1350° C. Densification typically is followed by a consolidation soak at a higher temperature, e.g., 1450°-1550° C. Exemplarily, the $GeO_2$-doped porous body is a substantially cylindrical body substantially uniformly doped with $GeO_2$, the density of the body being highest at and near the axis of the body. Such a body can, for instance, be produced by VAD in a known manner.

Although a cylindrical, uniformly doped porous body is currently considered to be most advantageous as a starting body, other geometries (e.g., tubular) and other doping profiles (e.g., a step profile, with the porous body comprising a central portion having a relatively high $GeO_2$ concentration that is surrounded by a peripheral portion having a relatively low $GeO_2$ concentration) may at times be advantageous. Such a tubular body could be produced, for instance, by an outside soot process such as OVPO. As currently preferred, the porous body typically has a radially non-uniform density, the density decreasing with increasing radius.

The porous $GeO_2$-doped high-silica body is then subjected to a heat treatment that comprises densification of the porous body under conditions that result in substantial decrease of the germania concentration in the peripheral portion of the germania-doped part of the porous body. It is usually desirable to densify the porous body under conditions such that the maximum concentration of germania in the body is not substantially decreased. The heat treatment may also comprise drying and possibly other steps, and frequently comprises a consolidation soak that completes the transformation of the porous body into a substantially homogeneous glass body.

Figure 2:
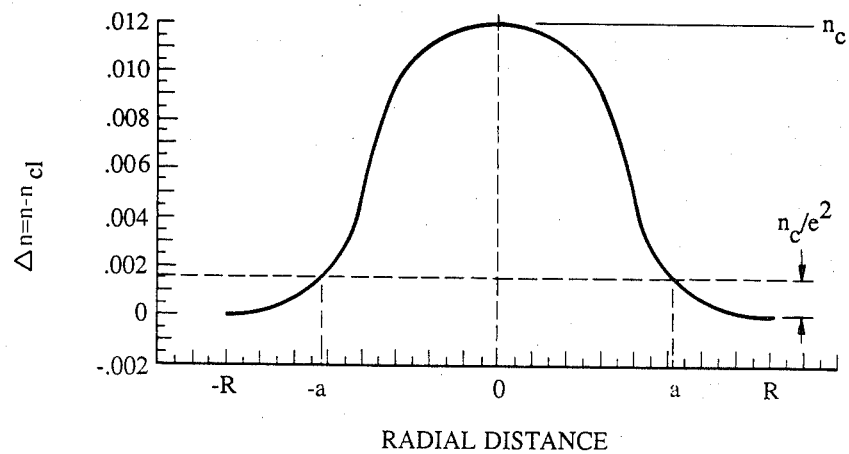
FIG. 2 shows an approximately Gaussian index profile.

FIG. 2 depicts a refractive index profile of the type that can be produced by means of the inventive technique. In particular, the Figure shows the index difference $\Delta n(r)$ as a function of radial distance. The maximum refractive index $n_c$ occurs at $r=0$, and $\Delta n(r)$ decreases smoothly for increasing values of r. The core radius a is indicated in the Figure, and $\Delta n$ goes to zero for radii substantially greater than a. The profile of FIG. 2 thus is an example of a Gaussian profile. Although it is conventional to define a to be radius at which $\Delta n = n_c/e^2$, other definitions of a are possible.

A significant aspect of the invention is the shaping of the dopant profile (and therefore of the refractive index profile) by removal of dopant from the porous body. In all commercially significant prior art fiber manufacturing processes known to us, efforts are made to reduce dopant removal to the lowest possible level. The inventive approach thus involves a significant departure from prior practice.

In the practice of the inventive method, the densification conditions (chiefly temperature and composition of the atmosphere) are selected such that the dopant D can form a volatile compound $DA_y$ with a component A of the atmosphere. Typically, the dopant is present in the porous body as an oxide $DO_{2y}$, and A typically is a halogen $X_2$. In other words, the conditions are chosen such that the reaction $DO_{2y} + 2yX_2 \rightleftharpoons DX_{4y} + yO_2$ strongly tends towards the right. This generally will be the case if the free energy of formation of the halide is smaller than that of the oxide. The equilibrium will be shifted to the right if the partial pressure of the halogen in the atmosphere is relatively large and that of oxygen is relatively small.

Figure 3:
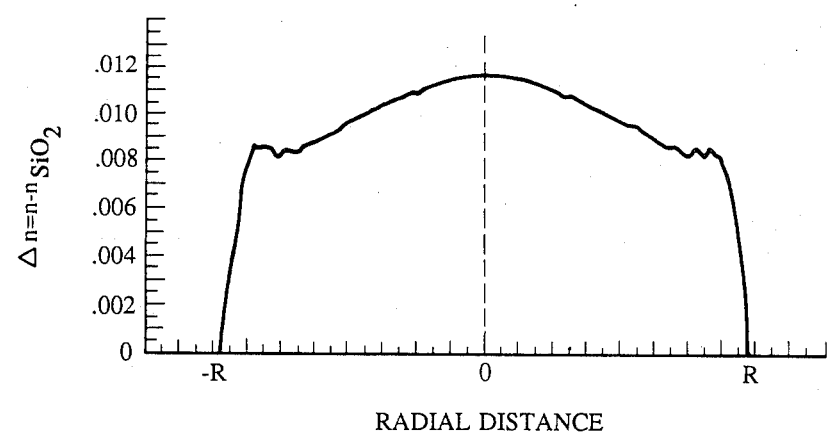
FIG. 3 exemplifies an unmodified actual index profile.

FIG. 3 depicts the actual refractive index profile of a $GeO_2$-doped silica glass rod (of radius R) obtained by consolidating a nominally uniformly doped, VAD-produced porous rod. The porous body was heat treated as follows: temperature ramped in 1 hour to 1000° C. from room temperature, 2 hour soak at 1000° C., rapid ramp to 1500° C., 3 hour soak at 1500° C., furnace cooling to room temperature. Essentially all of the heat treatment was carried out in a He atmosphere. As can be seen from FIG. 3, the index profile is substantially a step index profile, indicating that little or no dopant was lost during consolidation.

A second glass rod was prepared substantially as described above, except that the porous rod was soaked at 800° C., and that the atmosphere during the initial ramp and the 800° C. soak was 80% He, 20% $Cl_2$. The index profile was substantially as shown in FIG. 3.

Figure 4:
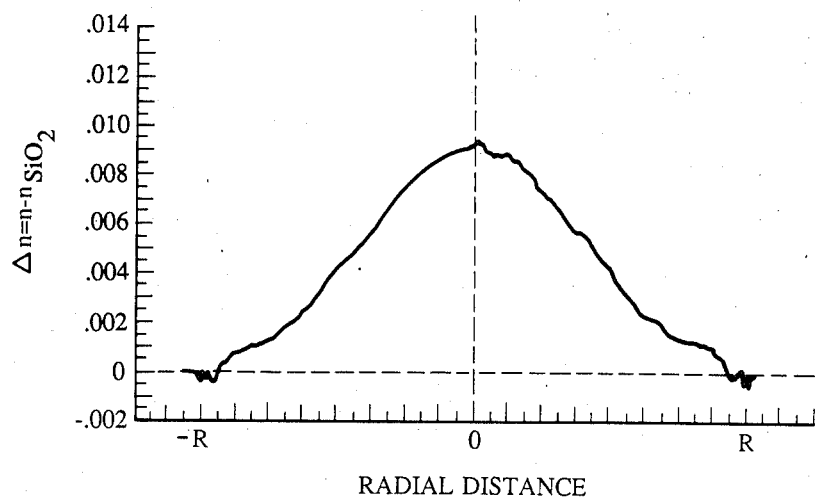
FIGS. 4 and 5 depict actual approximately Gaussian index profiles produced according to the inventive method.

A third glass rod was prepared substantially as the rod that was described in the preceding paragraph, except that the 3 hour soak in 80% He, 20% $Cl_2$ was followed by a 1 hour ramp to 1300° C. and a 2 hour densification soak, both in the He/$Cl_2$ atmosphere. This was followed by a rapid ramp to 1500° C., with a 3 hour consolidation soak, both in He. The index profile of the thus produced glass rod is shown in FIG. 4. As can be seen, the nominal step index profile has been transformed into an approximately Gaussian profile.

Figure 5:
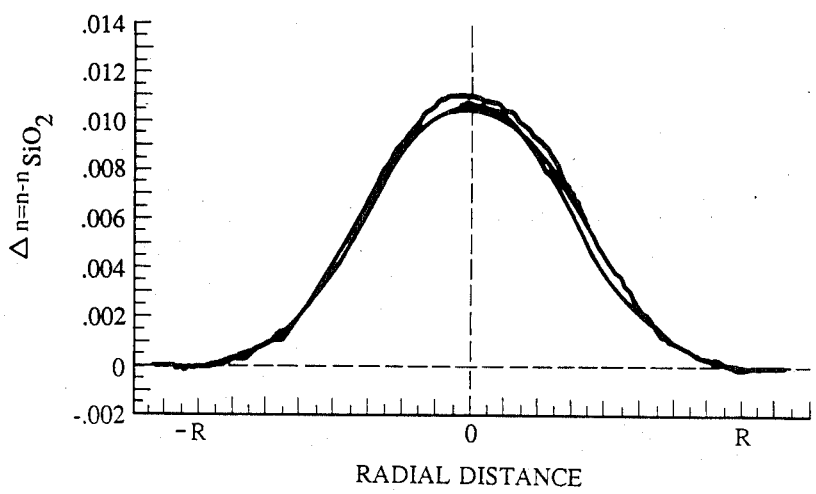

FIG. 5 shows the refractive indices of three rods produced as described in the preceding paragraph, except that the 1300° C. soak was increased to 8 hours (atmosphere still 80% He, 20% $Cl_2$). As FIG. 5 shows, the resulting glass rods have approximately Gaussian index profiles. If considered as core rods of diameter 2R then the core radius a is about 0.7R, with a cladding layer of approximate thickness 0.3R surrounding the core.

Figure 6:
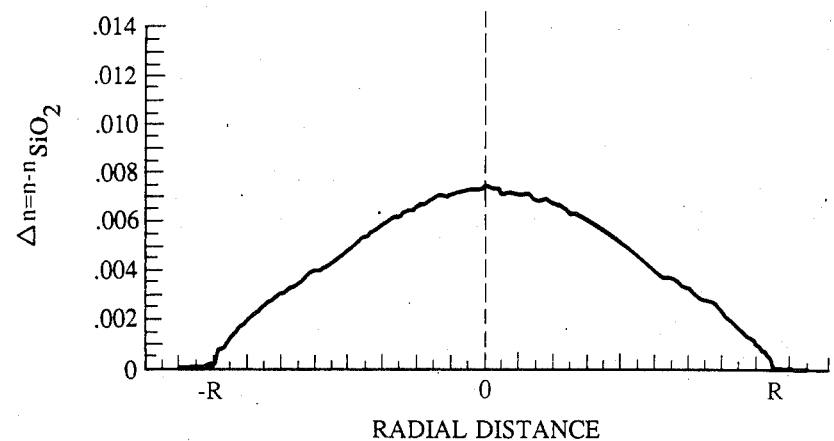
FIGS. 6 and 7 show actual index profiles obtained when consolidation was carried out at temperatures outside the preferred range.
Figure 7:
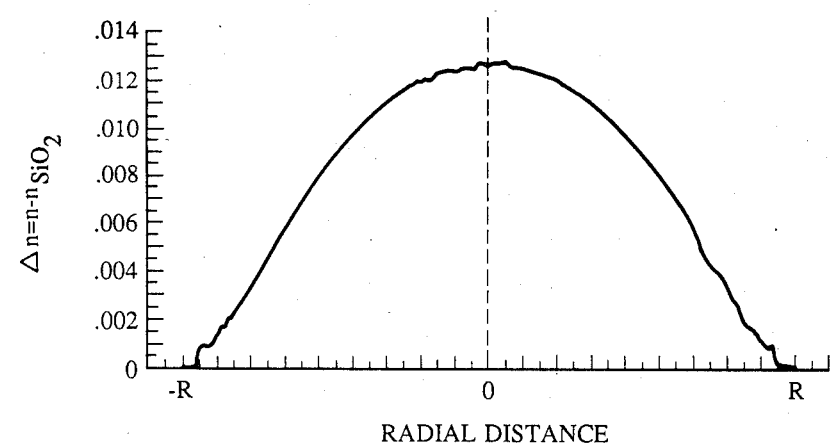

FIGS. 6 and 7 show refractive index profiles obtained when the densification was carried out at a relatively low (1200° C.) and relatively high (1350° C.) temperature, respectively. In both cases an approximately parabolic index profile, with little cladding, resulted. In the former case substantial lowering of the maximum germania concentration (and therefore of $n_c$) also resulted.

Results similar to those depicted in FIG. 7 were obtained when a specimen was fired as described in conjunction with FIG. 5, but with 20% $O_2$ added to the atmosphere. This confirms that the presence of $O_2$ inhibits removal of germania.

Figure 8:
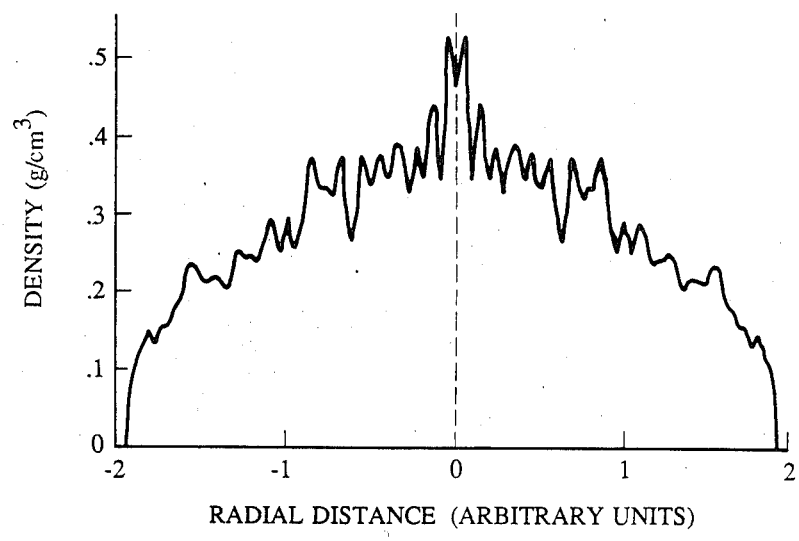
FIG. 8 shows the density profile of an unconsolidated core member as determined with a soot boule profiler.
Figure 9:
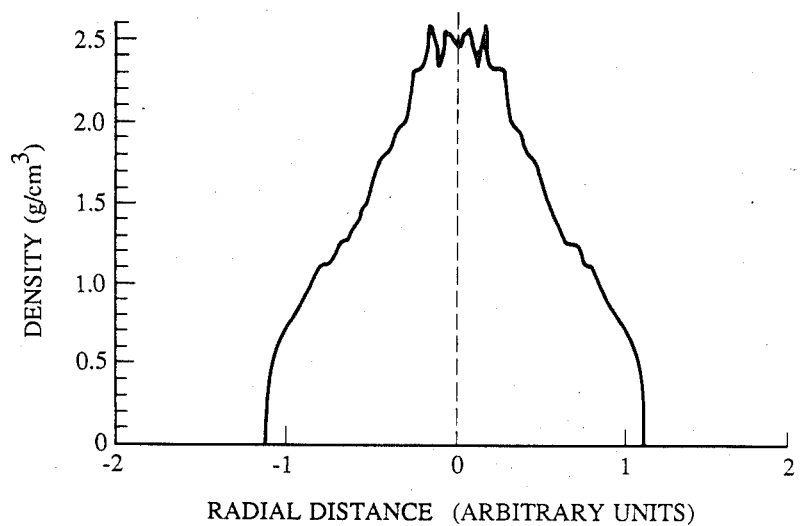
FIGS. 9 and 10 show the density and actual index profile, respectively, of a core member consolidated according to the inventive method.
Figure 10:
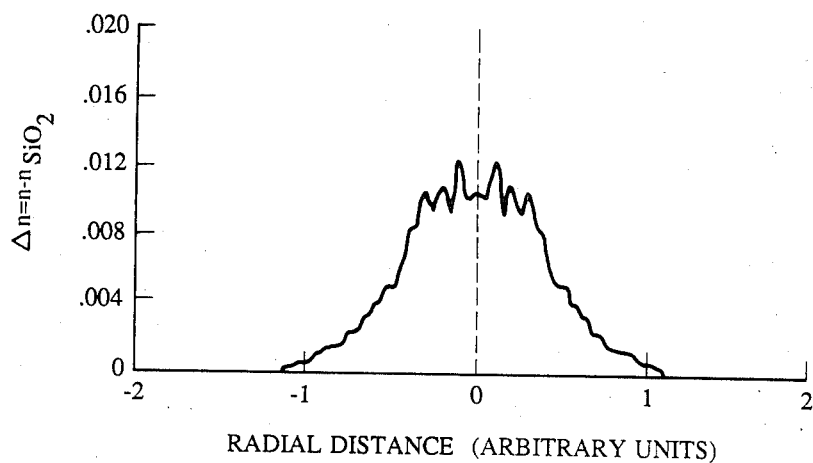

A porous VAD-produced $GeO_2$-doped cylinder substantially like the porous bodies used to obtain the results of FIGS. 3-7 was analyzed by means of a tomogrpahic technique, and the thus obtained density is shown in FIG. 8 as a function of radial distance. The rapid variations in the curve are believed to be measurement artifacts. Despite the presence of these artifacts, it is evident that the density of the porous body is a function of the radius, being highest in the center of the body. The $GeO_2$-profile of the porous body was also measured, and the refractive index profile determined therefrom. The index profile was substantially as shown in FIG. 3. The porous cylinder was then dried and densified in the same manner as described in conjunction with FIG. 5, and the density and refractive index again measured after completion of the firing. The results of the measurements are shown in FIGS. 9 and 10, indicating that the treatment resulted in an essentially fully consolidated region of the body, and in an approximately Gaussian index profile.

Figure 11:
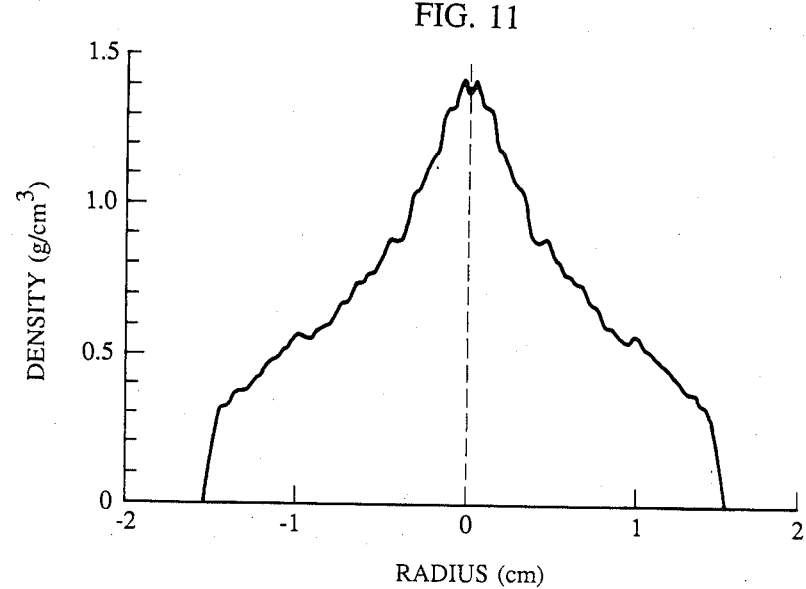
FIG. 11 shows the density profile of a core member consolidated at a temperature below the preferred temperature range.

The above results are to be contrasted with results shown in FIG. 11, which pertains to a porous VAD rod identical to the porous rod described in the previous paragraph, identically heat treated, except that the densification temperature was 1200° C. As FIG. 11 shows, the center of the body did not consolidate completely. The refractive index was substantially as shown in FIG. 6, indicating substantial removal of germania from the center region of the body.

As indicated by the above discussion, there frequently exists a relatively narrow range of densification temperatures that produces the desired results. We currently believe that for germania-doped silica it is typically advantageous to choose a consolidation temperature above about 1250° C. and below about 1350° C. However, depending on such factors as density and/or dopant level, temperatures outside of this range may also be useful. In general, the densification temperature may also depend on the nature of the dopant, and on the composition of the porous body. Furthermore, it will be appreciated that, if desired, after densification oxygen can be added to the atmosphere. For instance, the oxygen may remove chlorine and restore the oxygen balance in the not fully consolidated portion. The oxygen addition typically arrests the dopant removal.

Although we do not wish to be limited by any theoretical explanation, we currently believe that an appropriate densification temperature is one which causes relatively rapid collapse of pores in the central portion of the body, but which causes relatively slow collapse of the pores in the outer portion thereof.

Also as indicated by the above discussion, the atmosphere during consolidation should be relatively high in chlorine content and low in oxygen content. The ratio (vol. % $Cl_2$)$^2$/(vol. % $O_2$) should be greater than 1 vol. %, advantageously greater than 5, or even greater than 20 or 100. Most preferred is an essentially oxygen-free atmosphere. Other gases that can inhibit the volatilization of the dopant of course also should not be present in appreciable amounts. As indicated previously, it is anticipated that the invention can be practiced not only with $GeO_2$-doped high-silica but also with high-silica porous bodies doped with other dopants, and even with non-silica porous bodies, provided densification conditions are chosen such that appropriate dopant removal results.

In preferred embodiments a glass rod with Gaussian index profile, produced according to the invention, is used as core rod and overclad to result in a preform of appropriate geometry. The overcladding material can be added by any appropriate technique. A known advantageous technique comprises introducing silica particles into a hot zone so as to fuse the particles to the core rod. The hot zone can, for instance, be created by means of a oxy-hydrogen or a RF plasma torch. Typically the core rod is rotated, and the hot zone caused to traverse the length of the rotating core rod. The silica particles can be produced by any appropriate technique, e.g., by a sol-gel technique. See, for instance, the co-assigned U.S. patent application J. R. Fleming et al 17-15-53-2 ("Method for Fabricating Articles Which Include High Silica Glass Bodies and Articles Formed Thereby").

EXAMPLE

A porous $GeO_2$-doped silica body was formed by VAD. A torch of conventional VAD design, using 5 concentric silica tubes, was used. Deposition was carried out horizontally on a handle held in the chuck of a glass working lathe. The gas flow rates were selected such as to result in an essentially uniformly doped (about 7.5 mol. % $GeO_2$, corresponding to a $\Delta n$ of about 0.012) rod of about 40 mm diameter and about 100 mm length. The porous rod had a density profile substantially as shown in FIG. 8. The porous rod was heat treated in a closed silica muffle inside a furnace. The temperature was ramped in 1 hour from room temperature to 800° C. (atmosphere 100% He), followed by a two hour drying soak at 800° C. (80% He, 20% $Cl_2$), a one hour ramp to 1300° C. (80% He, 20% $Cl_2$), an eight hour densification soak at 1300° C. (80% He, 20% $Cl_2$), a rapid ramp to 1500° C. (100% He), a one hour consolidation soak at 1500° C. (100% He), followed by furnace cooling to room temperature. The oxygen content of the atmosphere was substantially less than 0.1% during this heat treatment. The resulting transparent glass rod has a diameter of about 18 mm and a length of about 60 mm, had a Gaussian refractive index profile substantially as shown in FIG. 5, with $\Delta n_c \sim 0.011$, a=5.5 mm, and an essentially uniform density of about 2.2 gm/cm$^3$. The glass rod was then stretched to a diameter of 2 mm, washed in trichloroethylene, rinsed in methanol and distilled water, etched in HF, fire polished, held horizontally on a handle in a glass working lathe, and silica overcladding material deposited thereon. The overcladding material was silica soot produced by flame hydrolysis in a known manner, and adhered to the consolidated core rod. The rod was rotated at 30 rpm, the soot-producing flame was reciprocated along the rod at 0.2 mm/sec, until the diameter of the composite body reached 61 mm. The composite body is then dehydrated at 1000° C. (2 volume % $Cl_2$, 98 volume % He), and the overcladding material is then consolidated at 1500° C., resulting in a fiber preform. From the thus produced fiber preform optical fiber is drawn in the conventional manner. The fiber has a Gaussian index profile, a core diameter of 5.4 μm, $\Delta_c=0.8\%$, a silica cladding, with the inner portion of the cladding derived from the core rod, and the outer portion being the soot-deposited overcladding. The transition between the two cladding regions occurs at a radius of about 8 μm. At 1.55 μm of the optical fiber is single mode, has essentially zero chromatic dispersion and has a loss below 1 db/km.

What is claimed is:

1. Method of producing an optical fiber, the method comprising
   (a) providing a porous body that comprises a dopant-containing region having a central portion and a peripheral portion, this dopant distribution in the porous body to be referred to as the initial dopant distribution;
   (b) heating the porous body such that the porous body is consolidated into a glass body, to be referred to as the intermediate glass body, the intermediate glass body having a refractive index profile;
   (c) making a preform by a process that comprises adding glass material to the intermediate glass body; and
   (d) drawing an optical fiber from the preform; wherein
   (e) the porous body has, during at least part of step (b), a radially non-uniform porosity and consequently a radially non-uniform density, with the density in the central portion of the dopant-containing region being higher than in the peripheral portion thereof; and wherein
   (f) step (b) further comprises heating the porous body to a temperature and for a time such that substantial densification of the porous body occurs, the porous body being contacted during at least part of this time with a halogen-containing atmosphere such that a part of the dopant is removed from the porous body such that a dopant distribution results that differs substantially from the initial dopant distribution, such that the refractive index profile in the intermediate glass body is a substantially Gaussian profile.

2. Method of claim 1, wherein the provided porous body has a radially non-uniform density.

3. Method of claim 1, wherein the dopant comprises germania, and wherein the provided porous body is a porous high-silica body having a radially non-uniform density.

4. Method of claim 3, wherein the heating of the porous body comprises maintaining the porous body at a densification temperature in the range from about 1250° C. to less than about 1350° C., and wherein the atmosphere comprises chlorine and oxygen such that, at least during a substantial portion of the time the porous body is maintained at the densification temperature, the ratio (vol. % chlorine)$^2$/(vol. % oxygen) is greater than about 5 vol. %.

5. Method of claim 1, wherein step (c) comprises adhering porous material to the intermediate glass body, and consolidating the porous material such that the preform results.

6. Method of claim 1, wherein, prior to step (b), the radial distribution of the dopant in the porous body is substantially constant.

7. Method of claim 1, wherein the optical fiber is dispersion shifted single mode fiber having a loss at 1.55 μm of less than 1 db/km.

8. Method of producing an optical fiber having a substantially Gaussian index profile, the method comprising
   (a) providing a porous high silica body that comprises a $GeO_2$-containing region having a central portion and a peripheral portion, this $GeO_2$ distribution in the porous body to be referred to as the initial $GeO_2$ distribution;
   (b) heating the porous body such that the porous body is consolidated into a glass body, to be referred to as the intermediate glass body, the intermediate glass body having a refractive index profile;
   (c) making a preform from the intermediate glass body by a process that comprises adhering porous glass material to the intermediate glass body, and consolidating the porous material such that the preform results; and
   (d) drawing an optical fiber from the preform; wherein
   (e) the provided porous body has a radially non-uniform porosity and consequently a radially non-uniform density, with the density in the central portion of the $GeO_2$-containing region being higher than in the peripheral portion thereof and wherein,
   (f) step (b) comprises heating the porous body to a temperature and for a time such that substantial densification of the porous body occurs, the porous body being contacted during at least part of this time with a chlorine-containing atmosphere such that a part of the $GeO_2$ is removed from the porous body, such that the resulting $GeO_2$ distribution differs substantially from the initial $GeO_2$ distribution and being such that the intermediate glass body has a substantially Gaussian index profile.

* * * * *